Figure 3:
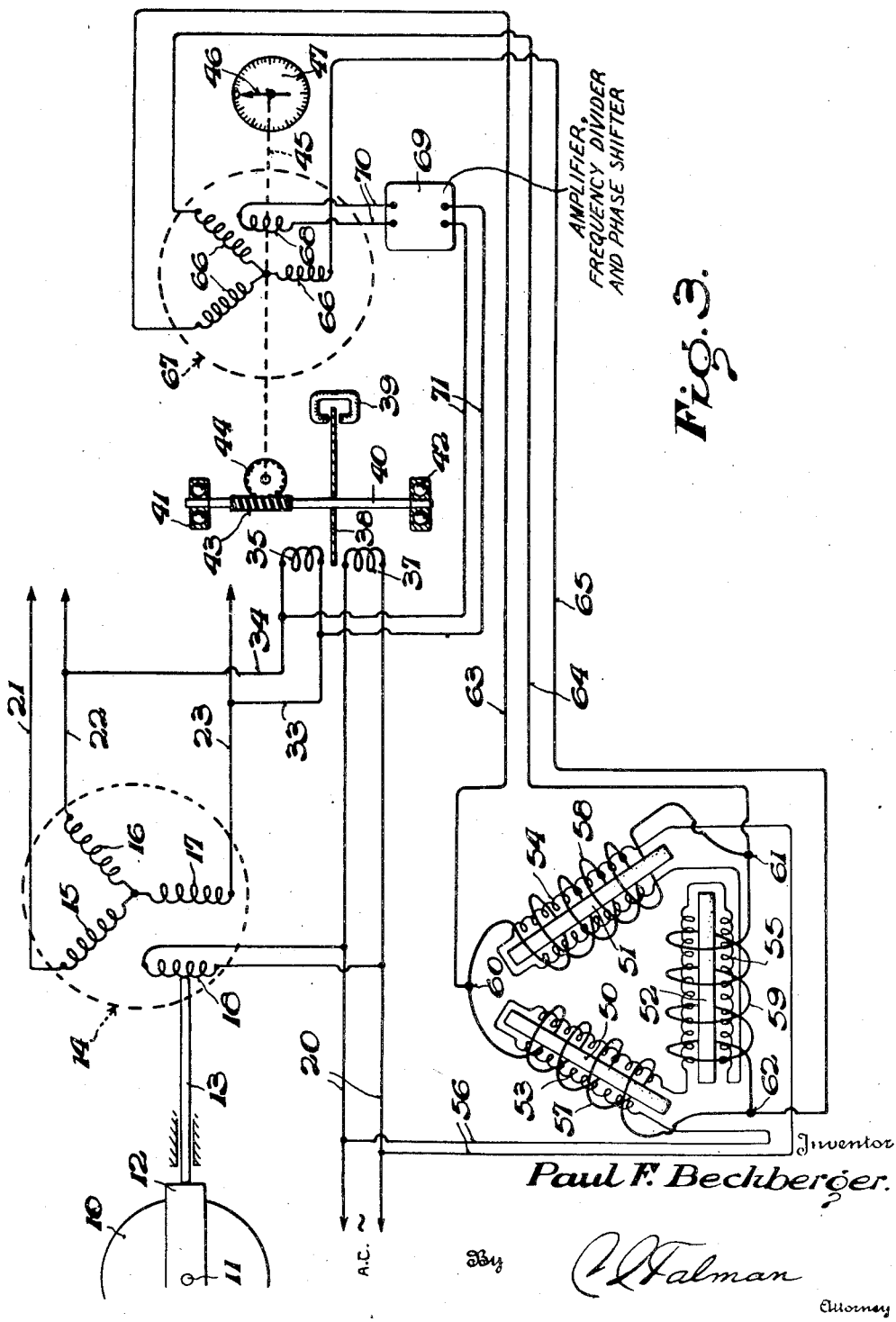

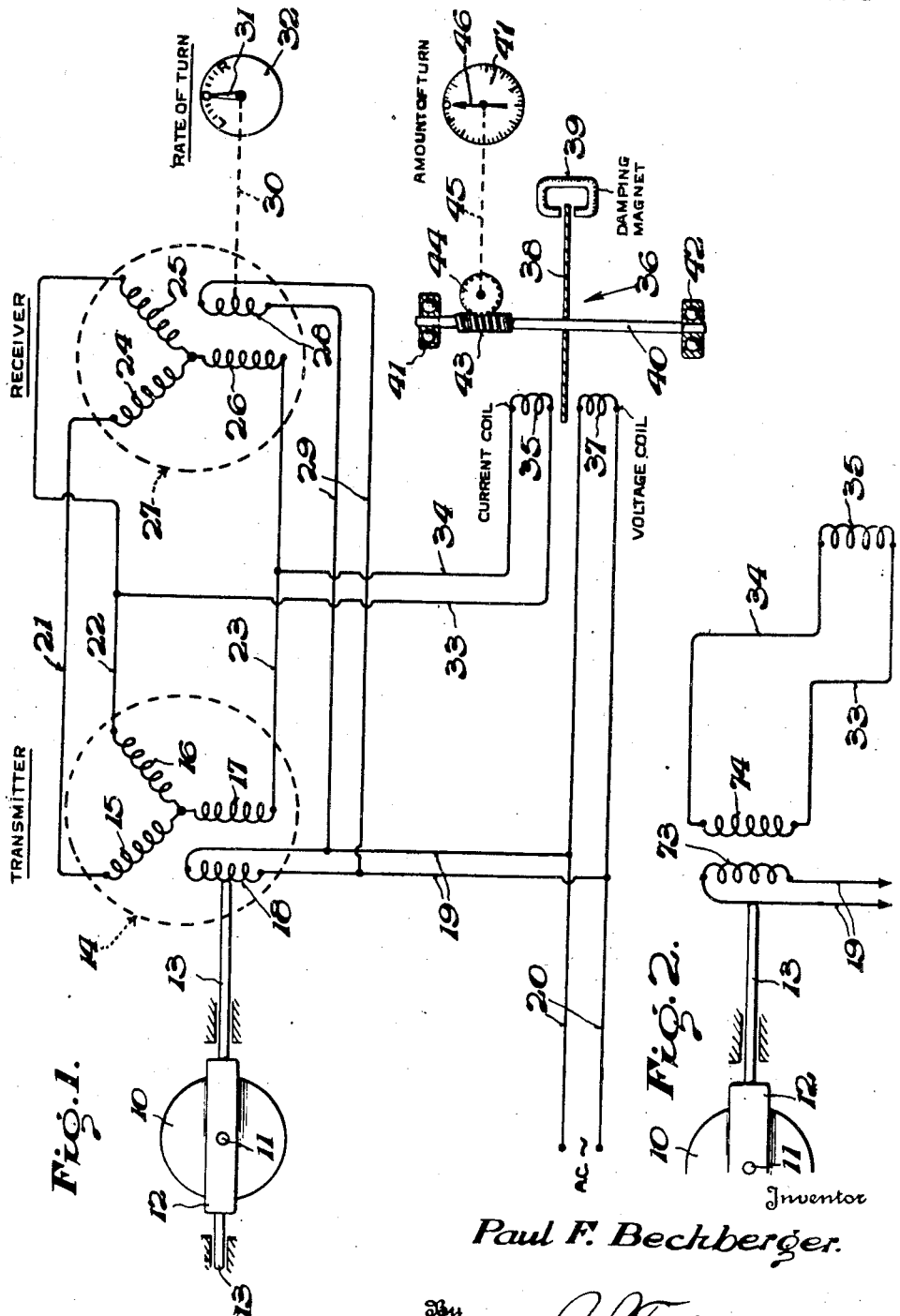

Oct. 19, 1948.  P. F. BECHBERGER  2,451,710
ORIENTATION SYSTEM
Filed Nov. 3, 1944  2 Sheets—Sheet 2

Inventor
Paul F. Bechberger.
By
C. D. Falman
Attorney

Patented Oct. 19, 1948

2,451,710

UNITED STATES PATENT OFFICE 2,451,710

ORIENTATION SYSTEM

Paul F. Bechberger, Tenafly, N. J., assignor to Bendix Aviation Corporation, Teterboro, N. J., a corporation of Delaware Application November 3, 1944, Serial No. 561,809

2 Claims. (Cl. 33—204)

This invention relates generally to orientation systems and more particularly to novel apparatus adapted for use as rate of turn indicators, heading or deviation indicators and/or controls for operating automatic steering systems for air or other mobile craft.

The present invention contemplates the provision of a novel system of the above character which embodies a conventional rate gyro, modified to the extent that the usual gyro precession and centralizing springs have been removed therefrom. In place of the springs, the axis of gyro oscillation is associated with an inductive transmitter device having an energized rotor movable with the gyro and an inductively coupled shorted stator or a variable transformer having an energized primary movable with the gyro and a shorted secondary, so that in response to gyro precession during a craft turn from a prescribed course the stator or secondary provide a yieldable counter torque on either the rotor or the primary to thereby oppose gyro precession as a rate of turn function and being effective upon completion of the turn to centralize the gyro. During and as a result of the turn, therefore, the transmitter or transformer develops a signal proportional to craft rate of turn which may be utilized to operate a repeater in accordance with such signal. Moreover, an integrating mechanism is associated with the transmitter or transformer whereby an amount of turn is derived from the rate of craft turn. Either or both of the functions so derived may be used for control and/or indicating purposes.

An object of the present invention, therefore, is to provide a novel system of the character described embodying a two-degree-of-freedom gyroscope from which both rate of turn and amount of turn functions are obtainable for either indicating and/or control purposes.

Another object of the invention is to provide a novel orientation indicator and/or control of the type utilizing a rate gyro.

A further object of the invention is to provide a novel navigational instrument for mobile craft especially adapted for providing accurate indication of the amount of deviation of a craft during a turn thereof.

Another object is to provide a novel gyroscopic rate of turn device for mobile craft wherein gyro precession during turn is constrained to a rate of turn function by novel electrical means, the latter also acting as gyro centralizing means upon completion of a craft turn.

A further and equally important object of the present invention is to provide a novel electric rate of turn integrator device.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts in both views, Figure 1 is a diagrammatic illustration of the electrical wiring diagram together with the various component parts comprising the novel orientation system of the present invention;

Figure 2 is a fragmentary showing of a somewhat modified form of electrical restraining means adapted for use with the system of Figure 1; and, Figure 3 is a view similar to Figure 1 but incorporating a compass correction for the system thereof.

Referring now to the drawings for a more detailed description of the present invention, and more particularly to Figure 1 thereof, the novel orientation system is shown as comprising a two-degree-of-freedom gyroscope having a rotor 10 provided with normally horizontal spin axis 11 mounting the rotor within a gimbal frame 12, the latter being provided with trunnions 13 for mounting the gyro on a mobile craft for oscillation about a second axis perpendicular to the spin axis. The axis of oscillation, i. e., that defined by trunnions 13, is preferably arranged parallel to the ship's fore and aft axis where the system is to be used as an orientation indicator.

In place of the usual precession restraining and centralizing springs, the rate gyro herein is associated with an inductive transmitter device, designated generally with the reference character 14, which may comprise a three phase stator having three windings 15, 16 and 17 arranged in Y-relation and an inductively coupled and angularly movable rotor winding 18, the latter winding being mounted for movement with an extension of one of trunnions 13. Winding 18, moreover, connects through suitable leads 19 and power leads 20 with a suitable source of alternating current (not shown).

Stator windings 15, 16 and 17 of transmitter 14 may, if so desired, connect by way of conductors 21, 22 and 23 with the three Y-connected stator windings 24, 25 and 26 of an inductive receiver device 27. The receiver, furthermore, is provided with an inductively coupled rotor winding 28 which connects with the power source and in parallel with rotor winding 18 by means of conductors 29 and which is mounted for angular motion by means of a shaft carrying at its free end a pointer 31 superimposed for angular motion over a suitable fixed dial 32, the latter being desirably graduated to indicate rate of craft turn.

With the structure thus far described, oscillation of the gyro about its axis of precession would be reproduced at the receiver but would serve no useful function thereat. Moreover, the gyro would remain in the new position and would never become centralized. To this end, therefore, that gyro precession will be limited to a rate of turn function which can be indicated accurately at the repeater and whereby such function may be integrated to obtain the amount of turn, two of the transmitter stator windings are effectively shorted as by connecting windings 16 and 17 through conductors 33 and 34 with a current coil 35 of an integrating mechanism like that of a conventional watt-hour meter, generally designated with the reference character 36. A voltage or fixed coil 37 connects with power leads 20 so that it together with coil 35 acts on a rotatably mounted integrator disc 38, formed of non-magnetic material and associated with a damping magnet 39, in a manner similar to the action of the fixed and variable phase of a two phase induction motor upon its related rotor. Integrator disc 38 is fastened to a shaft 40 which is journalled for rotation within bearings 41 and 42, the shaft further carrying a worm 43 engaging a worm wheel 44 carried by a shaft 45 whose free end is provided with a pointer 46 adapted for angular motion over a suitable dial 47 having a scale thereon similar to a compass scale graduated from zero to three hundred and sixty degrees.

The system is so designed that initially for a no turn condition, the gyro spin axis is substantially horizonal and rotor winding 18 bears a predetermined position relative to its stator windings 15, 16 and 17 in which the voltages induced in each of windings 16 and 17 are equal so that no current flows in coil 35, i. e., there is no potential difference across the two windings or across coil 35. The angle of resultant maximum coupling of windings 16 and 17 under such condition is normal to the resultant magnetic field of rotor winding 18 due to current flow therein. The signals present in windings 15, 16 and 17 also flow in receiver stator windings 24, 25 and 26 so that the resultant magnetic field thereat is in alignment with the magnetic field surrounding rotor winding 28 so that pointer 31 is maintained at its zero or no turn position on dial 32.

In response to a turn of the craft upon which the novel system of the present invention is provided, gyro 10 precesses about the axis defined by trunnions 13 thereby displacing rotor winding 18 of transmitter 14 angularly relative to stator windings 15, 16 and 17 whereupon the voltages in windings 16 and 17 are no longer equal so that a difference of potential is developed across these two windings providing current flow through coil 35. As a result of such current flow, however, the resultant of the magnetic field developed at the transmitter stator windings is angularly displaced to coact with the resultant magnetic field of rotor winding 18 to thereby yieldably oppose angular motion of the rotor so that gyro precession is limited to a rate of turn function and the ultimate angular displacement of rotor winding 18 for the same turn is proportional to the rate of craft turn. The proportionality relation referred to is readily acquired with the use of conventional and well-known synchros such as those known under the trade name "Selsyn." The signals developed at stator windings 15, 16 and 17 are modified as a rate of turn function and the same signals appearing at receiver stator windings 24, 25 and 26 provide an angular displacement in the resultant magnetic field thereat, which is no longer aligned with the resultant field of rotor winding 28, so that the two fields coact causing angular displacement of winding 28 until its field again assumes a relation of alignment with the field of its related stator. Pointer 31 moves relative to dial 32 with winding 28 to thereby indicate the rate of craft turn.

Once the turn has been completed, the gyro precession torque is eliminated and the field of the transmitter stator coacts with the field of its rotor 18, angularly displacing the latter until it reaches its normal position at which point the voltages in windings 16 and 17 again become equal. Gyro 10 is thus returned to its normally centralized position and the signals again being changed in both the transmitter and receiver stator, provide an angularly displaced resultant magnetic field at the receiver stator which in coacting with the field of rotor winding 28 displaces the latter until pointer 31 is moved to indicate zero or no turn on dial 32. It will now become apparent to those skilled in the art that a novel rate of turn indicating system is provided wherein the conventional calibrated precession springs have been entirely eliminated.

During turn, the current in coil 35 of the integrating mechanism is proportional to the displacement of rotor winding 18 and therefore to the rate of craft turn. Thus, the driving torque coils 35 and 37 exert on integrator disc 38 is proportional to the rate of turn. Magnet 39 exerts a retarding torque on integrator disc 38 proportional to the speed of the disc so that disc speed of rotation is proportional to the torque and hence the rate of turn. Motion of the disc is transmitted through worm 43 and wheel 44 to pointer 46 and movement of the latter relative to dial 47 represents the angular amount the craft has deviated or departed from a prescribed course during the existence of the craft turn.

The purpose of coil 37 is to make rotation of disc 38 independent of fluctuation in the supply voltage. If the voltage supplied to rotor winding 18 changes, the magnetic field of the rotor changes proportionally. As the rate of turn and, therefore, the torque developed by the shorted stator windings is independent of the field of the rotor winding and since the torque is proportional to the product of the rotor and stator fields then, for a given rate of turn, the current flowing in windings 16 and 17 and coil 35 is inversely proportional to the supply voltage. Since the voltage in coil 37 is directly proportional to the supply voltage, the rate of rotation of integrator dial 38, being proportional to the product of the voltage in coil 37 and the current in coil 35, is independent of the supply voltage.

Like all integrating systems, the above arrangement will ultimately develop some integration errors so that a reset by a compass may be provided to correct the ultimate position of pointer 46 on dial 47. To this end, the reset mechanism may comprise, as shown in Figure 3 of the drawings and more fully described in copending application Serial No. 555,155, filed September 21, 1944, a pendulously mounted earth inductor device, which may be mounted at some point of the craft having a minimum magnetic disturbance, such device comprising three delta arranged core members 50, 51 and 52. Each of the core members is provided with a pair of series-opposed energizing windings 53, 54 and 55 which connect through leads 56 with the supply source. Each of the core members, moreover, is provided with secondary or output windings 57, 58 and 59 which are connected in a delta relation thereby defining three taps 60, 61 and 62 which connect through leads 63, 64 and 65 with a three phase wound stator 66 of a coupling inductive device 67, the latter having inductively coupled therewith a rotor winding 68 fastened to shaft 45 for angular motion therewith. Winding 68, moreover, feeds to the input of a conventional vacuum tube amplifier 69 by way of conductors 70 and the amplifier output is connected by leads 71 to current coil 35 of the integrating mechanism.

Inasmuch as the theory and operation of such earth inductor compass systems is known, it is believed sufficient for a clear understanding of the present invention to state that as each core member is substantially saturated and unsaturated for each cycle of energizing current in primary windings 53, 54 and 55, the earth's field enters and leaves each core member twice per cycle of the fundamental frequency so that signals appear at output taps 60, 61 and 62 having a frequency double the frequency of the energizing current. These signals set up a resultant magnetic field at stator windings 66 which is normal to the electrical axis of rotor winding 68 when the latter is at a zero or null positon. Motion of the inductor device relative to the earth's field changes the signals at the three taps which are connected to the stator windings whereby the resultant field thereat changes relative to rotor winding 68 and a signal is induced in the winding which is fed by leads 70 to amplifier 69 whereby current flows in coil 35 to rotate disc 38 until rotor 68 is driven to its new null position relative to stator windings 66 moving pointer 46 therewith and deenergizing coil 35.

Inasmuch as the frequency of the signals in stator windings 66 due to the earth induction device is twice the frequency of the energizing current from the supply source, a conventional network (not shown) is provided in amplifier 69 so that the signal due to either the rate gyro or the compass or both appearing in the current coil 35 will have the same frequency as the energizing current of coil 37. Moreover, a conventional phase displacement network (not shown) may be included in amplifier 69 for providing substantially a 90° phase shift between the current of current winding 35 due to the signal from rotor winding 68 and the current in coil 37, such relationship already existing between coils 35 and 37 where current flow in coil 35 results due to motion of rotor winding 18.

It will not be apparent that a novel and desirable orientation system has been provided wherein during straight flight, if the system is used with aircraft, the rate gyro remains in a non-precessing position and the earth inductor device has primary control over the position of heading pointer 46. The system is so designed, however, that any signal developed by the earth inductor is relatively weak as compared to the signal developed because of gyro precession during a turn at an appreciable rate at which time the rate signal controls pointer movement.

If no integration errors were present in the system and the inductor element remained in a horizontal position, operation of the integrator mechanism during turn would actuate pointer 46 as well as displace rotor winding 68 from its null relative to stator windings 66. However, the varying signal from the earth inductor during turn will provide a moving resultant of the magnetic field at stator windings 66 so that the electrical axis of rotor 68 will remain substantially normal to the resultant of the stator field and no signal over and above that due to gyro precession will act on current coil 35. Due to integration errors, however, which may add to or substract from the true angle of pointer motion, rotor winding 68 will be displaced from its null to develop a signal opposing or aiding the current in coil 35 to correct for integration errors. On the other hand, during a turn, errors are introduced into a pendulously mounted compass which are eliminated by reason of the fact that during such turn the rate gyro assumes primary control of pointer 46. The gyro and compass are, therefore, mutually corrective and pointer 46 will at all times give a true indication of instantaneous heading.

The integrating mechanism may comprise, instead of that shown, a two phase induction motor with the variable phase thereof being energized by either or both the rate signal and the signal originating at rotor winding 68, together with a drag connection for the rotor of the motor whereby its speed will be maintained proportional to the rate of craft turn in the manner more fully shown and described in U. S. Patent No. 2,361,790 issued October 31, 1944. Moreover, instead of operating rate and heading pointers 31 and 46, the system may be used to operate the controls of an automatic pilot.

Also, in place of inductive transmitter device 14 shown in Figure 1, a variable transformer, such as that shown in Figure 2, may be used, such transformer comprising a primary winding 73 connected for angular motion with one of trunnions 13 and for energization from a suitable source by way of conductors 19. Primary 73 is inductively coupled with a secondary winding 74 which is shorted by way of conductors 33 and 34 across current coil 35 of the integrating mechanism of Figure 1. The operation of this arrangement is the same as that hereinabove described, i. e., windings 73 and 74 are in a normally uncoupled position. As soon, however, as the gyro precesses during a craft turn, winding 73 is displaced by way of trunnion 13 relative to its secondary 74 whereupon current flows in the secondary to develop a countermagnetic field at winding 74 opposing motion of primary 73 to yieldably restrain gyro precession to a rate of turn function. The angle of primary displacement will, therefore, be such as to provide a signal proportional to the rate of craft turn within coil 35 so that the integrating mechanism will function to displace pointer 46 an amount corresponding to the amount of craft departure from a given course during the turn. Once the turn is completed, the precession forces on the gyro are eliminated and primary 73 being unrestrained is moved back to null by the magnetic field of the secondary 74 until the signal in the secondary drops to zero.

Although a repeater 27 has been shown in Figure 1 it is to be expressly understood that such provision is made only where it is desired to remotely indicate rate of turn as well as the amount of turn but the repeater may be eliminated entirely leaving only transmitter device 14 and by connecting the pointer either to rotor winding 18 or directly to trunnion 13 an indication of the rate of turn may also be obtained.

There has thus been provided by the present invention a novel and simple orientation system embodying a rate of turn gyro eliminating the use of conventional restraining springs and which may act as a novel indicator of rate and/or amount of turn and which further may be applied to the control of an automatic steering system.

Although but a single embodiment of the invention has been illustrated and described, various changes and modifications in the form and relative arrangement of the parts, which will now appear to those skilled in the art, may be made without departing from the scope of the invention. Reference is, therefore, to be had to the appended claims for a definition of the limits of the invention.

I claim:

1. In combination, a two-degree-of-freedom gyroscope having a rotor mounted for spinning about one axis and for precession about a second axis perpendicular to the spin axis, electromagnetic means having a closed circuit and an energized movable part connected for operation by precession of said gyroscope and inductively coupled with said circuit whereby said circuit develops a counter force proportional to the rate of turn for opposing gyro precession and a current flows in said circuit proportional to the rate of turn, and means coupled with said circuit for deriving the amount of turn from the rate of turn.

2. In combination, a two-degree-of-freedom gyroscope having a rotor mounted for spinning about one axis and for precession about a second axis perpendicular to the spin axis, electromagnetic means having a closed circuit and an energized movable part connected for operation by the precession of said gyroscope and inductively coupled with said circuit whereby said circuit develops a counter-force proportional to the rate of turn for opposing gyro precession and a current flows in said circuit proportional to the rate of turn, means connected with said circuit for deriving the amount of turn from the rate of turn, means connected with said last-named means for operation in accordance with the amount of turn, and means connected with said circuit for operation in accordance with the rate of turn.

PAUL F. BECHBERGER.

REFERENCES CITED

The following references are of record in the file of this patent:

UNITED STATES PATENTS

| Number | Name | Date |
|---|---|---|
| 2,053,182 | Crane et al. | Sept. 1, 1936 |
| 2,274,443 | Fisher | Feb. 24, 1942 |
| 2,280,797 | Crane | Apr. 28, 1942 |
| 2,361,790 | Noxon | Oct. 31, 1944 |